United States Patent
Yan et al.

(10) Patent No.: US 8,433,725 B2
(45) Date of Patent: Apr. 30, 2013

(54) SCHEDULING FOR FAST RESPONSE MULTI-PATTERN MATCHING OVER STREAMING EVENTS

(75) Inventors: Ying Yan, Shanghai (CN); Jin Zhang, Shanghai (CN); Ming-Chien Shan, Saratoga, CA (US)

(73) Assignee: SAP AG, Walldorf (DE)

( * ) Notice: Subject to any disclaimer, the term of this patent is extended or adjusted under 35 U.S.C. 154(b) by 373 days.

(21) Appl. No.: 12/696,895

(22) Filed: Jan. 29, 2010

(65) Prior Publication Data

US 2011/0137942 A1    Jun. 9, 2011

(30) Foreign Application Priority Data

Dec. 9, 2009   (CN) .......................... 2009 1 0250437

(51) Int. Cl.
*G06F 17/00*  (2006.01)
*G06F 17/30*  (2006.01)

(52) U.S. Cl.
USPC ......................................................... 707/780

(58) Field of Classification Search .......... 707/705–781, 707/999.003–999.006
See application file for complete search history.

(56) References Cited

U.S. PATENT DOCUMENTS

2005/0192978 A1*  9/2005  Lightstone et al. ........... 707/100
2009/0100029 A1    4/2009  Jain et al.
2010/0057737 A1*  3/2010  Srinivasan et al. ................ 707/6

OTHER PUBLICATIONS

Wang et al, "Low-power greedy state pair grouping algorithm and power reduction estimation for finite state machine" Dec. 1, 1996; National Science Council pp. 1-9.*
Office Action for EP Application No. 10014629.9, mailed Aug. 6, 2012, 6 pages.

* cited by examiner

*Primary Examiner* — Jacob F Bétit
*Assistant Examiner* — Amanda Willis
(74) *Attorney, Agent, or Firm* — Brake Hughes Bellermann LLP

(57) ABSTRACT

A query pattern handler may be configured to determine at least one query pattern to be matched against a stream of events, and may be configured to determine a plurality of run-time patterns representing active instances of the at least one query pattern which are currently available for matching, and which each include a plurality of states. An event scheduler may be configured to receive an event of the stream of events, the event associated with a current event set of the stream of events. A run-time pattern scheduler may be configured to determine a ranked set of the run-time patterns based on a priority metric which characterizes, for each run-time pattern, an advancement of each run-time pattern from a current state thereof when matched against the current event set. A pattern match evaluator may be configured to evaluate each run-time pattern of the ranked set, in turn, against the current event set.

20 Claims, 6 Drawing Sheets

NFA Structure

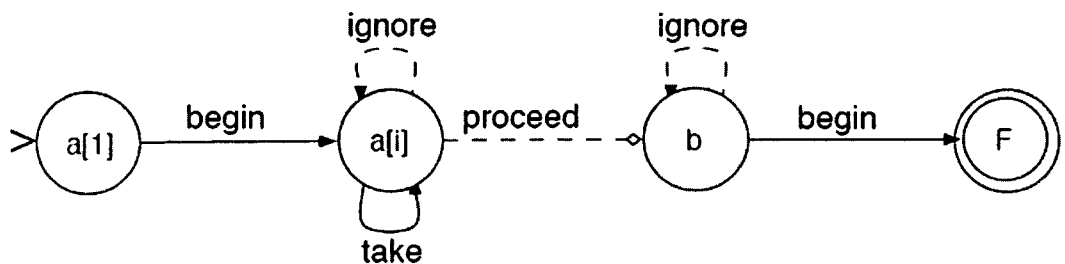

Basic formulas on edges

| θa[1]_begin = a[1].volume>1000 | θa[i]_take = a[i].symbol=a[1].symbol ∧ a[i].price>avg(a[..i-1].price) | θb_begin = b.symbol=a[1].symbol ∧ b.volume<80%*a[a.LEN].volume ∧ b.time<a[1].time+1 hour |
|---|---|---|
|  | θa[i]_proceed = True |  |
|  | θa[i]_ignore = ¬(a[i].symbol=a[1].symbol ∧ a[i].price>avg(a[..i-1].price)) | θb_ignore = ¬(b.symbol=a[1].symbol ∧ b.volume<80%*a[a.LEN].volume) |

Example formulas After optimization.

| θ*a[i]_take = θa[i]_take ∧ a[i].time<a[1].time+1 hour |
|---|
| θ*a[i]_ignore = θa[i]_ignore ∧ a[i].time<a[1].time+1 hour |
| θ*a[i]_proceed = θb_begin ∨ (¬θ*a[i]_take ∧ ¬θ*a[i]_ignore) |

FIG. 6

SCHEDULING FOR FAST RESPONSE MULTI-PATTERN MATCHING OVER STREAMING EVENTS

CROSS-REFERENCE TO RELATED APPLICATION

This application claims priority under 35 U.S.C. §119 to Chinese Patent Application No. 200910250437.X, filed Dec. 9, 2009, titled "SCHEDULING FOR FAST RESPONSE DURING QUERY PATTERN MATCHING OVER STREAM EVENTS," which is incorporated herein by reference in its entirety.

TECHNICAL FIELD

This description relates to query pattern matching over stream events.

BACKGROUND

Pattern matching in event processing generally refers to detecting a presence of predetermined patterns within a stream of arriving events. Such event streams may exist within a wide variety of settings, and may contain desired or otherwise-unknown information, which may be difficult to detect without the aid of suitable event stream processing techniques.

Examples of such event streams exist, for example, in the realms of business, industry, healthcare, government, and the military, as well as many other fields of endeavor in which sources generate events. As a specific example from the financial realm, the stock market continually generates current stock prices and other information about individual stocks throughout a trading day. In the airline industry, reservation systems and flight tracking systems generate events about ticket purchases and flight schedules. In the e-commerce realm, online stores are associated with events related to the viewing of store websites, and purchasing activities that may be associated therewith. Many other examples of such event streams are known to exist, some of which are referenced in more detail below.

One way to utilize such event streams is to extract information therefrom by detecting the presence of a pattern of events within the event stream. For example, using the examples just given, a first pattern may be used to detect certain price movements or other relevant information about a desired stock or group of stocks within the stock market. A second pattern may be applied to the airline setting, in order to determine, for example, particular increases or declines in airline reservations. In a third example, a pattern of returned items or customer complaints may be detected within an event stream of an online store.

In practice, then, query patterns may be defined which express a desired pattern to be detected within a specified event stream. Then, the defined query pattern and specified event stream may be compared to one another, in order to output detection of the query pattern when found within the event stream. In many settings, it may occur that a large number of events may be contained with an event stream, and may be arriving relatively quickly. Meanwhile, there may be a relatively large number of query patterns specified for comparison against the event stream in question. For example, a stream of events reflecting price updates and other information about the stock market may be arriving at a rapid pace, perhaps with respect to a large number of individual stocks. Meanwhile, the query pattern specifying a particular pattern of stock price movement or other stock activity may be specified for one or all of the relevant stocks. Consequently, a large number of events and a large number of query patterns may need to be evaluated, so that, as a result, there may be a delay in determining a corresponding evaluation for a particular stock.

In this regard, in many settings, a speed with which a match occurs between an event stream and a particular query pattern may be an important or critical factor. For example, in the example of the stock market just given, a stock trader may wish to detect a certain price pattern, and may specify multiple such patterns with respect to multiple stocks. In this example, the stock trader may wish to base a stock purchase or sale based on recognition of one or more of the specified patterns. However, depending on a number and/or rate of arrival of the events of the event stream, and/or on a number, size, or complexity of query patterns to be matched against the event streams, non-trivial delays may be experienced in outputting a determination of a match between a particular event and a corresponding query pattern. For example, a stock may reach a price which completes a match of a predefined query pattern. However, if the event associated with the stock price movement is preceded in time by a large number of other, previous events, and/or if a large number of query patterns have yet to be compared with any such preceding events, then the match between the particular event and its associated query pattern may not be detected and reported until some amount of delay has occurred. In the meantime, the purchase or sale opportunity associated with the query pattern may be mitigated or lost. Similar examples exist within the other settings and examples referenced above, and in other known applications of complex event stream processing. Thus, as these and other examples illustrate, a response time associated with matching an event and a query pattern may be an important metric in characterizing a usefulness of the matching.

SUMMARY

According to one general aspect, a system includes instructions recorded on a computer-readable medium. The system includes a query pattern handler configured to determine at least one query pattern to be matched against a stream of events, and configured to determine a plurality of run-time patterns representing active instances of the at least one query pattern which are currently available for matching, and which each include a plurality of states, an event scheduler configured to receive an event of the stream of events, the event associated with a current event set of the stream of events, a run-time pattern scheduler configured to determine a ranked set of the run-time patterns based on a priority metric which characterizes, for each run-time pattern, an advancement of each run-time pattern from a current state thereof when matched against the current event set, a pattern match evaluator configured to evaluate each run-time pattern of the ranked set, in turn, against the current event set.

Implementations may include one or more of the following features. For example, the query pattern handler may include a state machine generator configured to generate at least one finite state machine to represent the at least one query pattern, the at least one finite state machine including a plurality of states connected by edges having predicate conditions to be evaluated against events of the stream of events. The query pattern handler may include a runtime pattern generator configured to generate each runtime pattern of the plurality of runtime patterns, in response to a corresponding triggering event of the stream of events.

The event scheduler may include an event queue configured to store the current event set.

The runtime pattern scheduler may include a pattern list manager configured to maintain a pending list of the runtime patterns which are available for matching, and a running list which includes a subset of the pending list, including the ranked set, for provision to the pattern match evaluator therefrom. The runtime pattern scheduler may include a priority manager configured to calculate the priority metric based on characteristics of the stream of events.

The runtime pattern scheduler may include a priority manager configured to calculate the priority metric based on a current state of each runtime pattern. The runtime patterns may be expressed as finite state machines including a plurality of states connected by edges having predicate conditions to be evaluated against events of the stream of events, and the runtime pattern scheduler may include a priority manager configured to calculate the priority metric for each runtime pattern including an expectation of completion that is determined based on a length of each independent path through each state machine and a probability of completion of each path, including a conditional probability of the completion of each path considering individual predicate conditions of each path.

The runtime patterns may be expressed as finite state machines including a plurality of states connected by edges having predicate conditions to be evaluated against events of the stream of events, and the runtime pattern scheduler may include a priority manager configured to calculate the priority metric for each runtime pattern including a cost of completion that is determined based on a length of each independent path through each state machine.

The runtime pattern scheduler may include a priority manager configured to calculate the priority metric based on an expectation of completion of the runtime pattern relative to a cost of completion of the runtime pattern. The priority manager may be configured to use a dummy runtime pattern during a design time to estimate and store the expectation and cost for each state of a runtime pattern, and may be configured to compare a current event distribution and current state of the runtime pattern during runtime to retrieve a corresponding expectation and cost.

The runtime patterns may be expressed as finite state machines which include a plurality of states connected by edges having predicate conditions, and wherein the pattern match evaluator may be configured to evaluate each runtime pattern by comparing events of the current event set against each runtime pattern of the ranked set to determine whether each event of the current event set satisfies a current predicate condition thereof.

The pattern match evaluator may be configured to output all matched and completed runtime patterns of the ranked set as matched patterns, and may be further configured to return any remaining runtime patterns of the ranked set to the runtime pattern scheduler. The run-time pattern scheduler may be configured to receive the remaining runtime patterns for combination with any newly-available runtime patterns, and configured to re-determine the priority metric for each runtime pattern of the combination to determine an updated ranked set to be evaluated against an updated event set.

According to another general aspect, a computer-implemented method for executing instructions stored on a computer readable storage medium may include determining at least one query pattern to be matched against a stream of events, receiving an event of the stream of events, the event associated with a current event set of the stream of events, determining a plurality of run-time patterns representing active instances of the at least one query pattern which are currently available for matching, and which each include a plurality of states, determining a ranked set of the run-time patterns based on a priority metric which characterizes, for each run-time pattern, an advancement of each run-time pattern from a current state thereof when matched against the current event set, and evaluating each run-time pattern of the ranked set, in turn, against the current event set.

Implementations may include one or more of the following features. For example, determining the plurality of run-time patterns may include generating a corresponding plurality of finite state machines to represent each runtime pattern, each finite state machine including a plurality of states connected by edges having predicate conditions to be evaluated against events of the stream of events.

The evaluating may include outputting all matched and completed runtime patterns of the ranked set as matched patterns, and returning any remaining runtime patterns of the ranked set for combination with any newly-available runtime patterns. The method may include re-determining the priority metric for each runtime pattern of the combination to determine an updated ranked set to be evaluated against an updated event set.

According to another general aspect, a computer program product may be tangibly embodied on a computer-readable storage medium and may include instructions that, when executed, are configured to determine at least one query pattern to be matched against a stream of events, receive an event of the stream of events, the event associated with a current event set of the stream of events, determine a plurality of run-time patterns representing active instances of the at least one query pattern which are currently available for matching, and which each include a plurality of states, determine a ranked set of the run-time patterns based on a priority metric which characterizes, for each run-time pattern, an advancement of each run-time pattern from a current state thereof when matched against the current event set, and evaluate each run-time pattern of the ranked set, in turn, against the current event set.

Implementations may include one or more of the following features. For example, when executed, the instructions may be further configured to output all matched and completed runtime patterns of the ranked set as matched patterns, return any remaining runtime patterns of the ranked set for combination with any newly-available runtime patterns, and re-determine the priority metric for each runtime pattern of the combination to determine an updated ranked set to be evaluated against an updated event set.

The details of one or more implementations are set forth in the accompanying drawings and the description below. Other features will be apparent from the description and drawings, and from the claims.

BRIEF DESCRIPTION OF THE DRAWINGS

FIG. 6 is another specific example of a query pattern and associated state machine.

DETAILED DESCRIPTION

Figure 1:
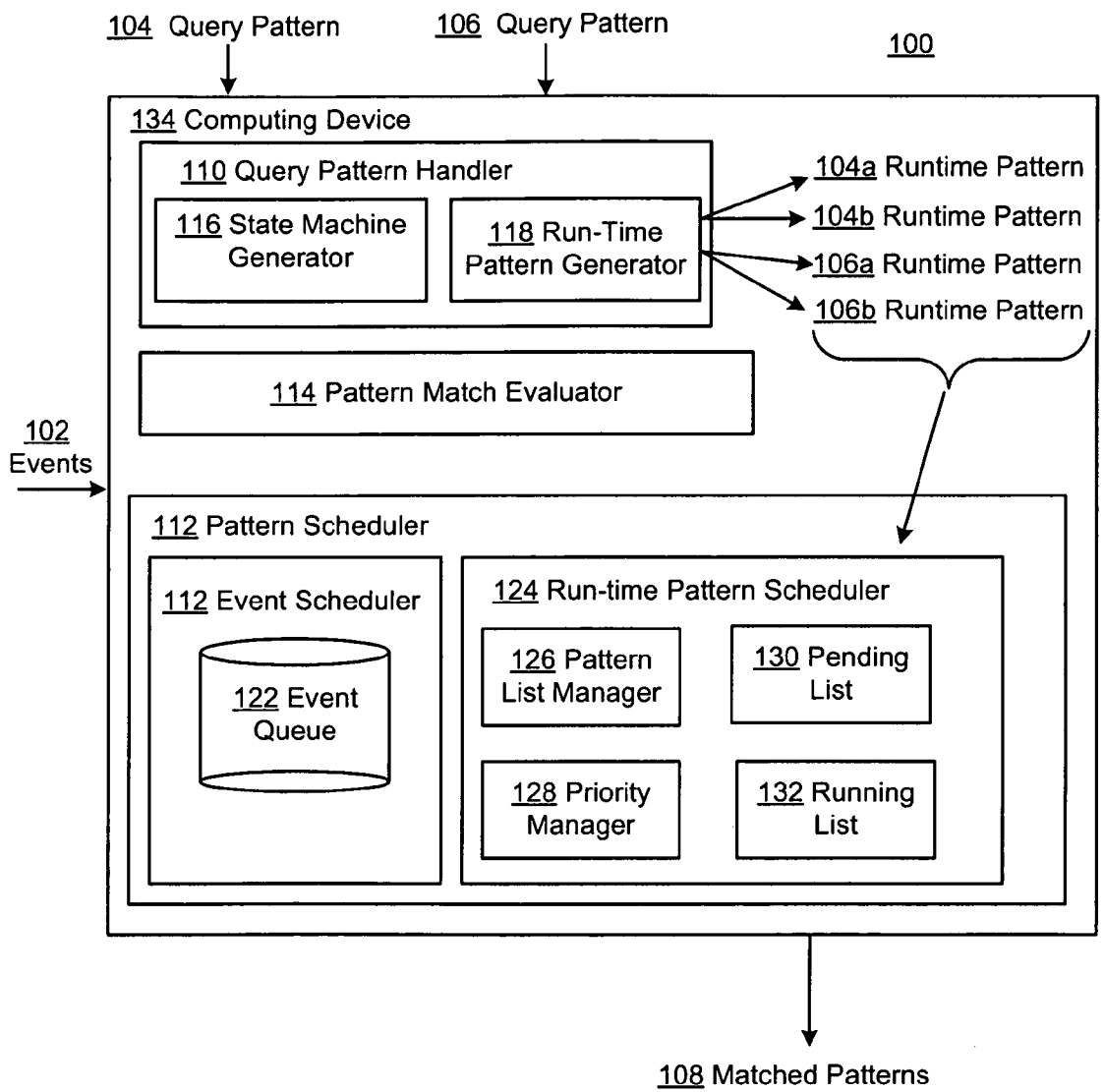
FIG. 1 is a block diagram of a system for scheduling for fast response during query pattern matching over stream events.

FIG. 1 is a block diagram of a system 100 for scheduling for fast response during matching of query patterns over a stream of events. In the example of FIG. 1, a stream of events 102 is received to be matched against a plurality of query patterns 104, 106. During operation, comparison of the events 102 with one or both of the query patterns 104, 106 may yield one or more matched patterns 108 that are output by the system 100. As described in detail below, the system 100 is designed to minimize an average response time for a group of events and associated (matched) query patterns, where the response time refers to a time difference between an arrival of a particular event of the events 102 and an identification of a match between such an event and an instance of one of the query patterns 104, 106. In this way, the user of the system 100 may be provided with information about an occurrence of a desired or specified pattern within the events 102 as quickly as possible, so that the user may take appropriate action based thereon.

During operation, the system 100 includes a query pattern handler 110 which may be configured to receive the query patterns 104, 106, and to generate active instances thereof for evaluation against the events 102. In the description provided herein, such active instances are referred to as runtime patterns, and, in the simplified example of FIG. 1, there are two runtime patterns for each of the query patterns 104, 106. Specifically, as shown, the query pattern handler 110 may be configured to receive the query pattern 104 and output two corresponding runtime patterns 104A, 104B. Similarly, the query pattern handler 110 is configured to receive the query pattern 106 and output corresponding runtime patterns 106A, 106B.

Additional detail regarding operations of the query pattern handler 110 in this regard is provided below, but, in general, it may be appreciated that the runtime patterns 104A, 104B, 106A, 106B represent active instances of the underlying query patterns 104, 106, which are in the process of being evaluated relative to the events 102. In general, though, it may be appreciated that the query patterns 104, 106 represent templates or abstract representations or characterizations of desired query patterns, whereas the corresponding runtime patterns 104A, 104B, 106A, 106B represent actual applications or occurrences of the templates which are being actively evaluated relative to the stream of events 102.

A pattern scheduler 112 may be configured to receive the events 102 and any available runtime patterns, including the example runtime patterns 104A, 104B, 106A, 106B, and may be configured to present some or all of the events and runtime patterns to a pattern match evaluator 114. The pattern match evaluator 114 may be configured to then consider potential matches between the events and runtime patterns, so that, for example, as referenced above, the pattern match evaluator 114 may ultimately output matched patterns 108 for use by a user of the system 100.

As described in detail below, the pattern scheduler 112 may be configured to schedule some or all available events and runtime patterns for presentation to the pattern match evaluator 114 in a manner which reduces an average response time in which the match patterns 108 are obtained. That is, the pattern scheduler 112 is configured to provide the events and runtime patterns to the pattern match evaluator 114 in an order designed to optimize an average response time of system 100 in providing the matched patterns 108.

In the example of FIG. 1, the query pattern handler 110 may include a state machine generator 116 that is configured to express each of the query patterns 104, 106 in the form of state machine. Examples of such state machines are described below with respect to FIGS. 2A-2D, and in detail with respect to FIG. 5. In general, however, such state machines generally include a plurality of states of a query pattern in question. The states are connected by edges which are associated with predicate conditions, which are defined to advance the state machine of the query pattern in question from a first state to a second state, upon the determination that a received event satisfies the intervening predicate condition associated with the edge connecting the first state and the second state. Consequently, the arrival of subsequent events which are matched to predicate conditions between consecutive states may be understood to advance the state machine between states, and, ultimately, from an initial state to a final state. Upon reaching the final state, the query pattern (i.e., the corresponding active runtime pattern) may be said to be completed or matched.

The query pattern handler 110 also may include a runtime pattern generator 118 which accesses a relevant state machine of the state machine generator 116 for each query pattern in question, so as to thereby generate corresponding runtime patterns. For example, as described in detail below, a query pattern 104 may exist within the system 100 and be received by the query pattern handler 110 for a generation of an associated state machine by the state machine generator 116. Upon arrival of a first event of the events 102, or some other triggering event or condition, the runtime pattern generator 118 may generate the runtime pattern 104A. Similarly, upon receipt of a later or different event, the runtime pattern generator 118 may again use the relevant state machine of the state machine generator 116 to generate a second active instance of query pattern 104, i.e., the runtime pattern 104B. Similarly, the runtime pattern generator 118 may use a state machine representation of the query pattern 106 to generate corresponding runtime patterns 106A, 106B, e.g., perhaps in response to corresponding events which are received and which trigger instantiation of the runtime pattern 106A, 106B from the query pattern 106.

The pattern scheduler 112 may include an event scheduler 120 that is generally responsible for managing an order and use of the received events 102 within the context of the pattern scheduler 112. For example, the event scheduler 120 may be configured to provide one or more of the events 102 to the pattern match evaluator 114 in conjunction with corresponding runtime patterns provided to the pattern match evaluator 114 by a runtime pattern scheduler 124. In practice, it is possible that the events 102 may be received at a relatively slow rate, so that the event scheduler 120 may provide events to the pattern match evaluator 114 upon an arrival of each event. In many embodiments, however, it may occur that a rate of arrival of the events 102 may be sufficiently fast that it becomes difficult or impossible for the pattern match evaluator 114 to evaluate desired ones of the available runtime patterns from the runtime pattern scheduler 124 prior to arrival of a subsequent event of the events 102. Consequently, as shown, the event scheduler 120 may include an event queue 122 which is responsible for buffering or otherwise storing events of the events 102 which have been received, but which are not yet ready or available for evaluation by the pattern match evaluator 114.

The runtime pattern scheduler 124, analogously to the event scheduler 120, is responsible for providing desired ones of the runtime patterns 104A, 104B, 106A, 106B to the pattern match evaluator 114 (in conjunction with events provided by the event scheduler 120), in an order and manner which is designed to minimize an average response time of the system 100 in providing the matched pattern 108, as described herein. In so doing, the runtime pattern scheduler 124 may include a pattern list manager 126 which maintains multiple lists populated by different sets or subsets of the available runtime patterns.

As shown, one such list or queue may include a pending list 130 which includes all of the available runtime patterns 104A, 104B, 106A, 106B which are currently available for providing to the pattern match evaluator 114. However, in the system 100, not all such available runtime patterns of the pending list 130 may be presented to the pattern match evaluator 114 at a given time. Rather, a priority manager 128 may be implemented to rank, sort, or otherwise prioritize a subset of the pending list 130. Then, such a ranked subset may be included within a running list 132 which represents runtime patterns that are actively being provided to the pattern match evaluator 114 for evaluation thereof in conjunction with events received from the event scheduler 120.

As described in detail below, the priority manager 128 may be configured to prioritize certain runtime patterns of the pending list 130 which are considered to be most likely to substantially profit or benefit (e.g., advance in state) from being matched to a current set of events provided by the event scheduler 120. Consequently, the pattern match evaluator 114 is more likely to advance or complete a runtime pattern using the set of current events in the event queue 122, so that an average response time of the matched patterns 108 may be improved.

The system 100 may provide various modes of operation, so that a particular operational mode may be selected which is thought to be most advantageous in a given circumstance, or in response to a particular request or preference or a user of the system 100. For example, in an event-based mode, the event scheduler 120 may receive the events 102 and may provide each event in turn to the pattern match evaluator 114. In this mode, the runtime pattern scheduler 124 may simply provide each available runtime pattern, in turn, to the pattern match evaluator 114 to be matched against a current event from the event scheduler 120. In other words, a single event may be compared against all available runtime patterns, whereupon any resulting advancements or completions of such runtime patterns are determined by the pattern match evaluator 114, so that the thus-considered event may then be discarded.

Such event-based processing may be particularly advantageous, for example, when an arrival rate of the events 102 is relatively slow. That is, if an event is received at the event scheduler 120 and forwarded to the pattern match evaluator 114, and a relatively long delay exists until a subsequent event of the events 102 is received, then the system 100 may take advantage of the intervening time to evaluate the event in question against available runtime patterns 104A, 104B, 106A, 106B. Similarly, such event-based scheduling may be suitable in situations where available runtime patterns are relatively small in number and/or straightforward to calculate, so that, again, received events may be processed quickly relative to an arrival rate of a subsequent event.

Conversely, in other settings, the runtime pattern scheduler 124 may be configured to select each runtime pattern for comparison against a set of events stored in the event queue 122. In such run-based scheduling, each runtime pattern may be compared against the set of events in the event queue 122, whereupon the pattern match evaluator 114 may determine whether an advancement or completion of the runtime pattern occurs (e.g., whether one or more states of the corresponding state machines are advanced by the events in question). Thus, a given runtime pattern may be advanced or completed, whereupon a next runtime pattern may be matched by the pattern match evaluator 114 against the same set of events within the event queue 122. As opposed to the event-based scheduling described above, such run-based scheduling may be most beneficial when an arrival rate of the events 102 is relatively fast, or when processing of the runtime patterns in question is relatively complex or lengthy.

Thus, in general, the above described event-based scheduling may be considered to represent a "one to many" relationship between a single event and a plurality of runtime patterns being considered within the pattern match evaluator 114. Conversely, the run-based scheduling described above may be considered to represent a "one to many" relationship between a single runtime pattern considered at a given time with respect to a plurality of events within the event queue 122. As referenced, the different modes of operations of the system 100 may be best-suited for a given circumstance or setting of the system 100. In other embodiments, as described herein, the system 100 may be operated in a hybrid mode in which events and runtime patterns are considered in a "many to many" relationship to one another, so that, as described, an average response time associated with matched patterns 108 of a corresponding plurality of events and runtime patterns may be minimized.

In FIG. 1, a simplified version of the system 100 is illustrated in which only two query patterns 104, 106 are illustrated as having only two runtime patterns each (104A/104B, 106A/106B respectively). The system 100 is illustrated as being executed using a single computing device 134, which may be understood to include any necessary or desired computing resources. For example, the computing device 134 may include one or more processors which may be assigned to execute the operations of the system 100, perhaps in parallel, so as to accelerate an overall operation of the system 100 in providing matched patterns 108. Other appropriate hardware may be included, such as, for example, appropriate memory used to implement the event queue 122, the pending list 130, and the running list 132, as would be apparent. Further, computer readable storage media may be used to store instructions for executing the system 100 using the one or more processors of the computing device 134, referenced above.

In practice, of course, the system 100 may be implemented using hundreds, thousands, millions, or more query patterns, along with (potentially) a commensurate number of the events 102. The system 100 may be implemented using a plurality of computing devices, which may be connected or otherwise in communication with one another over a computer network, such as the public internet or a corporate intranet. Other configurations and variations of the system 100 would be apparent to one skilled in the art.

Figure 2A:
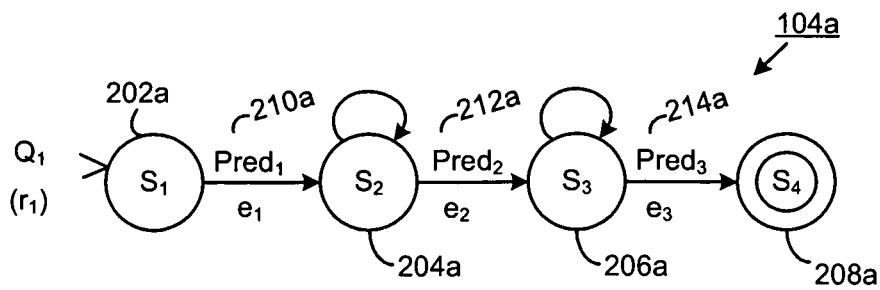
FIG. 2A is a diagram of a first runtime pattern evaluated using the system of FIG. 1.
Figure 2B:
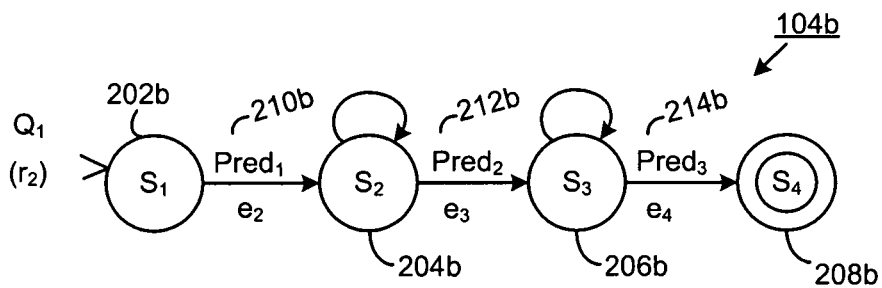
FIG. 2B is a diagram of a second runtime pattern evaluated using the system of FIG. 1.
Figure 2C:
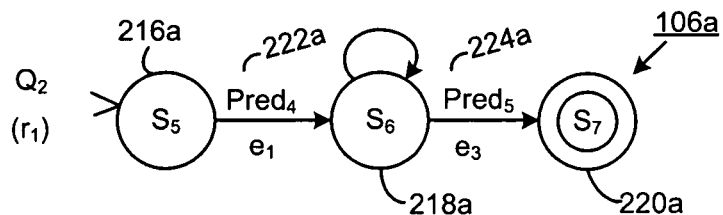
FIG. 2C is a diagram of a third runtime pattern to be evaluated using the system of FIG. 1.
Figure 2D:
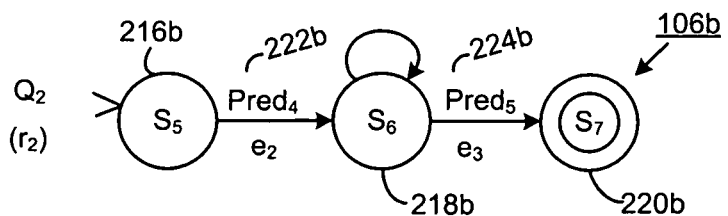
FIG. 2D is a diagram of a fourth runtime pattern to be evaluated using the system of FIG. 1.
Figure 2E:
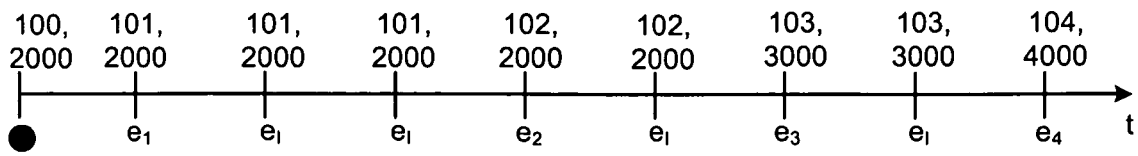
FIG. 2E is a timeline of streaming events received by the system of FIG. 1 and evaluated with respect to the runtime patterns of FIGS. 2A-2D.

FIGS. 2A-2E provide more detailed examples of the simplified version of the system 100 of FIG. 1, for use in explaining example operations of the system 100. In particular, as shown, FIGS. 2A and 2B correspond respectively to runtime patterns 104A and 104B, while FIGS. 2C and 2D correspond respectively to runtime patterns 106A and 106B. Further, FIG. 2E illustrates a timeline of events which are evaluated with respect to the runtime patterns of FIGS. 2A-2D.

In the example of FIGS. 2A-2E, a specific setting is considered in which the query pattern 104, 106 represent patterns to be detected with respect to one or more stocks or other equities being currently traded within an equity market. Again, the provided examples are simplified examples for the sake of explanation, and are not intended to represent a complete or exhaustive use or implementation of the system 100.

In the simplified example of FIGS. 2A-2E, it is assumed that the events 102 correspond to stock price and stock trading volume of a particular stock. In the example, the query pattern 104 may be designed to detect a price pattern in which a price of the stock in question increases by one or more points at least three times within a given time window. Meanwhile, the query pattern 106 may represent a price and volume pattern in which a stock price increase of at least one point is followed by or associated with a trading volume increase of at least 1000 shares.

Thus, the query pattern 104 may be expressed using known techniques and syntax (examples provided below) to capture the above-referenced price pattern. The state machine generator 116 may then generate a corresponding state machine, an instance of which is shown in FIG. 2A, in which states 202A, 204A, 206A and 208A correspond to price movements of the underlying stocks which are desired to be detected, and corresponding events e1, e2, e3 trigger predicate conditions 210A, 212A, 214A, which advance the state machine of the runtime pattern 104A through the various states 202A-208A.

In more detail, as may be appreciated from the above discussion, the state machine generator 116 may generate a generic version of the query pattern 104 expressing state machine form, whereupon the runtime pattern generator 118 may generate a runtime pattern 104A as an instantiated or active instance of the generic or underlying state machine/query pattern. As described, the runtime pattern generator 118 may execute such a generation in response to receipt of a triggering event of the events 102 which is defined or recognized as instantiating the active state machine of FIG. 2A. As a matter of notation, FIG. 2A illustrates that the query pattern 104 is referenced as $Q_1$ having an active or substantiated runtime pattern ($r_1$), while states 202A, 204A, 206A, 208A are illustrated as $S_1, S_2, S_3, S_4$, respectively.

Considering the example of FIG. 2A with respect to the example timeline of events shown in FIG. 2E, a conceptual understanding of the state machine may be appreciated. For example, if the state 202A is associated with a stock price 100 as shown in FIG. 2E, then the event e1 at which the stock price advances to 101 may be seen to satisfy the predicate condition 210A of an increase in stock price of one point or more, so that the runtime pattern 104 advances to the next state 204A. Subsequently, the timeline of FIG. 2E illustrates the following events illustrating interval or intermediate events $e_i$ in which the stock price stays at 101, so that the state 204A is maintained within the runtime pattern 104A. Subsequently, the event e2 illustrates an increase in the stock price to 102, thereby satisfying the predicate condition 212A of an increase in stock price of one or more points, so that the runtime pattern 104A advances to the state 206A. Again, one or more intermediate events $e_i$ may occur at which the stock price stays at the current price of 102, until an event e3 occurs at which the stock price advances to 103, thereby satisfying the predicate condition 214A and advancing the state machine of the runtime pattern 104A to the final state 208A. At this point, a matched pattern of the matched pattern 108 may be output, signifying that the specified stock price pattern of three or more price increases of one point or more have occurred within the specified time window.

Similar comments may be said to apply to the example of FIG. 2B, except that the example of FIG. 2B may be instantiated at a later time than the example of FIG. 2A. That is, it may be appreciated that each new stock price represents an opportunity or possibility of the future occurrence of the specified price pattern, where such a possibility ultimately may or may not be fulfilled. That is, at a time of instantiation of a particular runtime pattern, it is impossible to know whether the potential for the matching of the desired stock price pattern will be filled by the particular instance of the runtime pattern in question relative to corresponding events.

For example, it may occur for a particular runtime pattern that two consecutive increases of a point or more are observed, but that the stock price then stays the same throughout a remainder of a specified time window during which the stock price pattern was desired to be observed. In comparison, a subsequent event (i.e., received stock price) also may represent the possible future match of the desired price pattern, so that if such an event occurs after the first event of the first runtime pattern, it may yet occur that the second event may fulfill the desired stock price pattern within its own associated (later) window of time.

In other words, for the two active instances 104A, 104B of the same underlying query pattern 104, each having the same specified time window for completion, it may occur that a later-starting runtime pattern has an opportunity to complete a match which may not be available for the prior-starting runtime pattern. Thus, it may generally be observed that a separate instance or runtime pattern may need to be instantiated for each arriving event or type of event, so as to be sure to capture a desired pattern.

In the example of FIG. 2B, the runtime pattern 104B advances substantially the same as the runtime pattern 104A of FIG. 2A. However, as just described, the runtime pattern 104B instantiates with an event subsequent to an initiating event of the runtime pattern 104A. For example, such an initiating event of the runtime pattern 104B may be or include the event e1, or one of the intervening events $e_i$. In any case, in the example of FIG. 2B, the state 202B is illustrated as being advanced by the event e2 in the associated predicate condition 210B, specifying an increase of one point or more from the previous stock price 101, to thereby advance the runtime pattern 104B to the state 204B. Similarly, the event e3 and stock price of 103 satisfy the predicate condition 212B and advance the runtime pattern to the state 206B. The event e4 having a stock price of 104 satisfies the associated predicate condition 214B, and advances the runtime pattern 104B to its final state (and thus a match of the matched pattern 108) of the runtime pattern 104B.

FIGS. 2C and 2D illustrate example implementations of the runtime patterns 106A and 106B, respectively. As referenced above, and appreciated from the description of FIGS. 2A and 2B, the example of FIG. 2C illustrates a situation in which a state 216A is advanced by the event e1 and the predicate condition 222A specifying an advance in the stock price of one point or more, so that the runtime pattern 106A reaches the state 218A. Subsequently, the event $b_3$ may satisfy a predicate condition 224A which specifies an increase in trading volume of at least 1000 shares, so that the runtime pattern 106A advances to a final state 220A.

Similarly, in FIG. 2D, the runtime pattern 106B instantiates at a later time than the runtime pattern 106A, based on a later-received event, so that a state 216B is advanced by the event e2 and the predicate condition 222B of an increase in the stock price of one point or more, so that the runtime pattern 106B reaches the state 218B. Similarly, the event e3 satisfies the predicate condition 224B specifying an increase in trading volume of at least 1000 shares, so that the runtime pattern 106B advances to a final state 220B.

It may be observed that although a runtime pattern 106B was instantiated and began executing at a later time than the runtime pattern 106A, both runtime patterns reach the final state in association with the event e3. More generally, it may be observed from the described examples of FIGS. 2A-2D and the timeline of FIG. 2E that multiple query patterns 104, 106 each may be associated with a plurality of instantiated active instances or runtime patterns. Such runtime patterns may begin at different, e.g., overlapping or parallel times, and may experience completion or matching at the same or different times than one another.

In other examples, not specifically illustrated in the examples of FIGS. 2A-2D, an active runtime pattern may be stopped or destroyed. For example, a match may become impossible in a given circumstance, such as when a time window specifying a maximum duration of a particular runtime pattern is exceeded.

Further, it may be observed that at a given point in time, each particular runtime pattern may be very near or very far from advancing toward, or reaching, a final state thereof. For example, in FIG. 2A, the runtime pattern 104A may currently reside in the initial illustrated state 202A. At this state, it may be observed that the runtime pattern 104A must experience at least three more matching events before reaching the final state 208A. Conversely, another runtime pattern of the same underlying query pattern may already be in the state $S_3$, and thus may need only a single additional event to reach a completed or final state. If the runtime pattern 104A and the state 202A is already very near to a maximum window of time for determining the associated price pattern, then it may be very unlikely that the runtime pattern 104A may complete prior to expiration of the time window.

Further, characteristics of the underlying event stream 102 may contribute to increasing or decreasing a likelihood of advancement or completion of a given runtime pattern. For example, again in the example of FIG. 2A, the underlying stock may have experienced consecutive price declines over a period of time, which may be calculated or determined to reduce a future likelihood of the desired stock price pattern of three consecutive price increases of one point or more.

Thus, generally speaking, it may be appreciated that for each active or existing runtime pattern, there may be an expectation of likelihood that one or more received events will advance or complete the pattern in question. Such expectations or likelihoods may depend, e.g., on characteristics of the underlying query pattern, or of the current state of the runtime pattern in question, or on underlying characteristics of the past or anticipated events of the event stream 102. Further, each runtime pattern may be associated with a certain cost necessary to advance the runtime pattern, or to complete the runtime pattern. For example, as referenced above, the runtime pattern in an initial state may be associated with a higher cost of completion than the runtime pattern which is in a next to final state. The expectation and/or cost of advancing or completing any given runtime pattern may further depend on a nature or type of the predicate conditions of the runtime patterns in question, or on other characteristics of the system 100 in general.

Specific details and further examples of how runtime patterns may be characterized are provided below. In general, however, it may be appreciated that such characterizations of the runtime patterns may be used to rank or otherwise prioritize the runtime patterns relative to one another. For example, as referenced above, the priority manager 128 of the runtime pattern scheduler 124 may execute a ranking algorithm relative to the existing runtime patterns, so that runtime patterns which are most likely to advance in a significant way or to complete a match are also more likely to be provided to the pattern match evaluator 114 for evaluation against current events provided by the event scheduler 120.

By ranking the available (e.g., pending) runtime patterns in this manner, and selecting a subset or ranked set thereof, the pattern scheduler 112 may be configured to provide event sets of the event scheduler 120, along with such ranked sets of runtime patterns from the runtime pattern scheduler 124, to the pattern match evaluator 114. Consequently, as referenced herein, the system 100 may be configured to output the matched patterns 108 in an average response time which is minimized and which therefore may be more likely to satisfy a need of the user of the system 100.

Figure 3:
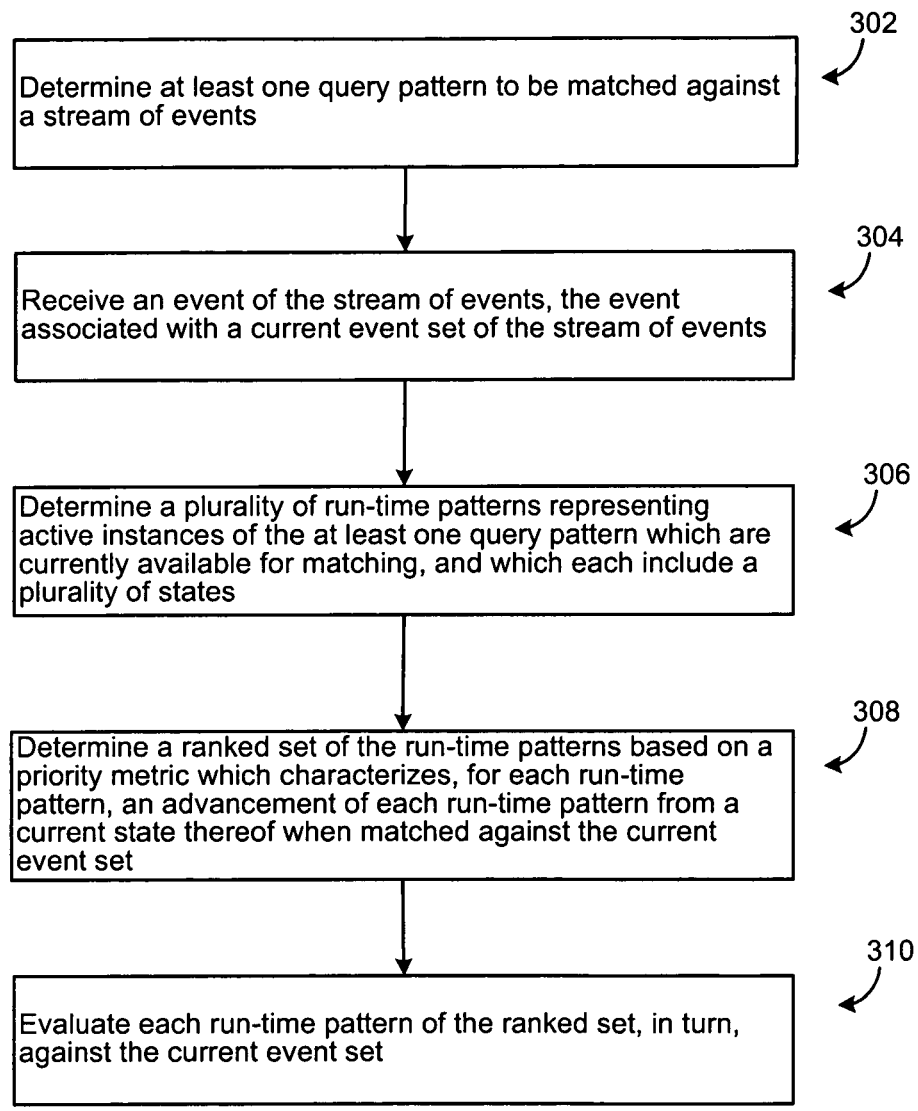
FIG. 3 is a flowchart illustrating example operations of the system of FIG. 1.

FIG. 3 is a flowchart 300 illustrating example operations of the system 100 of FIG. 1. As described below, operations of the flowchart 300 may be useful in improving, e.g., decreasing, an average response time of the system 100 in providing a set of matched patterns 108. Although operations 302-310 of the flowchart 300 of FIG. 3 are illustrated as discrete, sequential operations, it may be appreciated that FIG. 3 merely illustrates non-limiting examples, and that other additional or alternative operations may be included, as well. For example, operations of the flowchart 300 may occur in an overlapping or parallel fashion with respect to one another. Multiple operations may be included within a single operation during an actual execution of the system 100, and/or an order of the operations 302-310 may be different than that shown and described with respect to FIG. 3 (unless explicitly specified otherwise herein).

In the example of FIG. 3, at least one query pattern to be matched against the stream of events may be determined (302). For example, as described above, the query pattern handler 110 may receive the query patterns 104, 106 from a user or from a separate computing system (not shown in FIG. 1). As described, such query patterns may be specified with respect to events 102 of a corresponding event stream, so that information related to the existence of the specified patterns within the event stream 102 may be detected therein for use by a user of the system 100.

An event of the stream of events may be received, the event being associated with a current event set of the stream of events (304). For example, the event scheduler 120 may receive an event of the event stream 102, potentially for storage within the event queue 122. As described below with respect to FIG. 4, if the event is the first or only received event, then the event set may be defined completely by the single event. However, in other implementations, the event queue 122 already may include one or more stored events which have previously been received and which are part of a previous event set. Then, the newly-received event may be added to such a previous event set to thereby define the current event set.

A plurality of runtime patterns representing active instances of at least one query pattern and which are currently available for matching may be determined, in which each such runtime pattern includes a plurality of states (306). For example, as described above, the state machine generator 116 may generate a state machine corresponding to a query pattern 104, whereupon the runtime pattern generator 118 may instantiate the state machine for the query pattern 104 to obtain the runtime pattern 104A, which may then be received by the runtime pattern scheduler 124. Similar comments apply to the runtime pattern 104B, and similar operations may be performed by the state machine generator 116 and the runtime pattern generator 118 with respect to the query pattern 106, to thereby obtain the runtime patterns 106A, 106B, which themselves may be supplied to the runtime pattern scheduler 124.

In this way, the runtime patterns 104A, 104B, 106A, 106B, as represented by corresponding state machine instances illustrated in FIGS. 2A, 2B, 2C, and 2D, respectively, may be provided to the runtime scheduler 124. Whereupon, the pattern list manager 126 may store the runtime patterns 104A, 104B, 106A, 106B within the pending list 130. In the described example, the illustrated runtime patterns are shown as the first or only runtime patterns within the system 100, so that the pattern list manager 126 may add these available runtime patterns to an otherwise empty pending list 130. In practice, however, the pending list 130 already may be populated with previously-instantiated but not-yet-completed runtime patterns, so that the pattern list manager 126 may add the newly-available runtime patterns 104A, 104B, 106A, 106B to the existing pending list of runtime patterns.

A ranked set of the runtime patterns may be determined, based on a priority metric which characterizes, for each runtime pattern, a potential advancement of each runtime pattern from a current state thereof when matched against the current event set (308). For example, the priority manager 128 may calculate such a priority metric for each runtime pattern within the pending list 130. At a given point in time, each runtime pattern within the pending list 130 exists at a current state of its corresponding or respective state machine. As described herein, the priority metric may thus characterize a potential advancement of each runtime pattern from this current state to a subsequent and/or final state, i.e., may characterize a potential advancement of each runtime pattern with respect to the current event set.

As described, the priority metric may be estimated, calculated, empirically observed, or otherwise determined, based on, e.g., one or more characteristics of elements of the system 100. For example, the priority metric may be determined based on characteristics of events of the event stream 102, or on predicate conditions of the state machines of the various runtime patterns of the pending list 130, or on a current state of each runtime pattern relative to previous or future states. Thus, in general, the priority metric may express, e.g., an extent to which one or more events of the current event set, if matched against a particular runtime pattern, will significantly advance that runtime pattern toward completion.

Consequently, the priority metric, if used as described to generate the ranked set or subset of the pending list 130, thus provides those runtime patterns of the pending list 130 which are most likely to experience significant advancement from a current state toward a matched state, when evaluated relative to events of the current event set within the event queue 122. Thus, a response time between the time of receipt of each event of the current event set and an actual output of corresponding match patterns of the match pattern 108 may, on average, be reduced.

By way of contrast and comparison, it may be appreciated that without the described priority metric and associated ranking of the pending list 130, then the various runtime patterns of the system 100 may be presented to the pattern match evaluator 114 in a random or otherwise suboptimal manner. As a consequence, an event may arrive, and may wait an excessive amount of time and/or be fruitlessly matched against a number of runtime patterns before being evaluated with respect to a runtime pattern which actually provides a match of the match pattern 108. In the meantime, significant delay may be experienced, so that the response time between receipt of such an event and corresponding matched pattern(s) may be undesirably or unacceptably lengthened. Specific and detailed examples of the determination and use of the priority metric are provided below.

Each runtime pattern of the ranked set may be evaluated, in turn, against the current event set (310). For example, the pattern match evaluator 114 may receive the current event set from the event scheduler 120, and may receive the ranked set of runtime patterns from the runtime based scheduler 124. In the latter regard, as described in more detail below, the pattern list manager 126 may be configured to select the ranked set of runtime patterns from the pending list 130 for inclusion within an actual executing set of runtime patterns, i.e., the running list 132, which is provided to the pattern match evaluator 114.

The pattern match evaluator 114 may, for example, receive the runtime pattern having the highest or otherwise most optimal priority metric, and may then proceed to compare each of that current event set against the selected runtime pattern. If the runtime pattern experiences completion due to advancement through its various states in response to the evaluation against the events of the current event set, then the pattern match evaluator 114 may output the matched runtime pattern accordingly as part of the matched patterns 108. The pattern match evaluator 114 may then repeat these evaluation operations for each runtime pattern of the ranked set, until all such runtime patterns have been evaluated. At this point, the operations 302-310 of FIG. 3 may repeat in whole or in part.

If, on the other hand, a runtime pattern of the ranked set provided to the pattern match evaluator 114 does not reach a final state thereof for inclusion in the match pattern 108, in response to the evaluation against the events of the current event set, then the runtime pattern may either be destroyed or returned to the pending list 130. For example, in the latter regard, a particular such runtime pattern may be advanced during the evaluation process from the first state to a third state of four possible states. In this case, the thus-updated runtime pattern may be returned in its new state to the pending list 130.

In other examples, as referenced, a given runtime pattern matched against the current event set may be deleted or destroyed if it is determined that a match between such a runtime pattern and any current or future events will be impossible. For example, such a runtime pattern may exceed its specified maximum window length, so that the runtime pattern may be deleted from the system 100. In such a case, of course, the runtime pattern is not returned to the pending list 130, and the pending list 130 is thus reduced in size due to the non-inclusion of such stopped or deleted runtime patterns therefrom.

Operations of the flowchart 300 of FIG. 3 may thus continue in whole or in part, as referenced above. For example, as new events arrive from the event stream 102, the above-described processes may be repeated. For example, the priority manager 128 may then re-rank the current pending list of runtime patterns, and provide an updated ranked set to the running list 132 and ultimately to the pattern match evaluator 114 for comparison against a corresponding updated event set which includes the newly arriving event (as well as, or in addition to, intervening events which may have arrived at the system 100 during the previous iteration of evaluations of the pattern match evaluator 114). Thus, over time, the system 100 may be observed to evaluate those runtime patterns which are most likely to be matched against a current event set, so that, on average, a response time in determining such matched patterns for the current event set and corresponding runtime patterns may be minimized.

Figure 4:
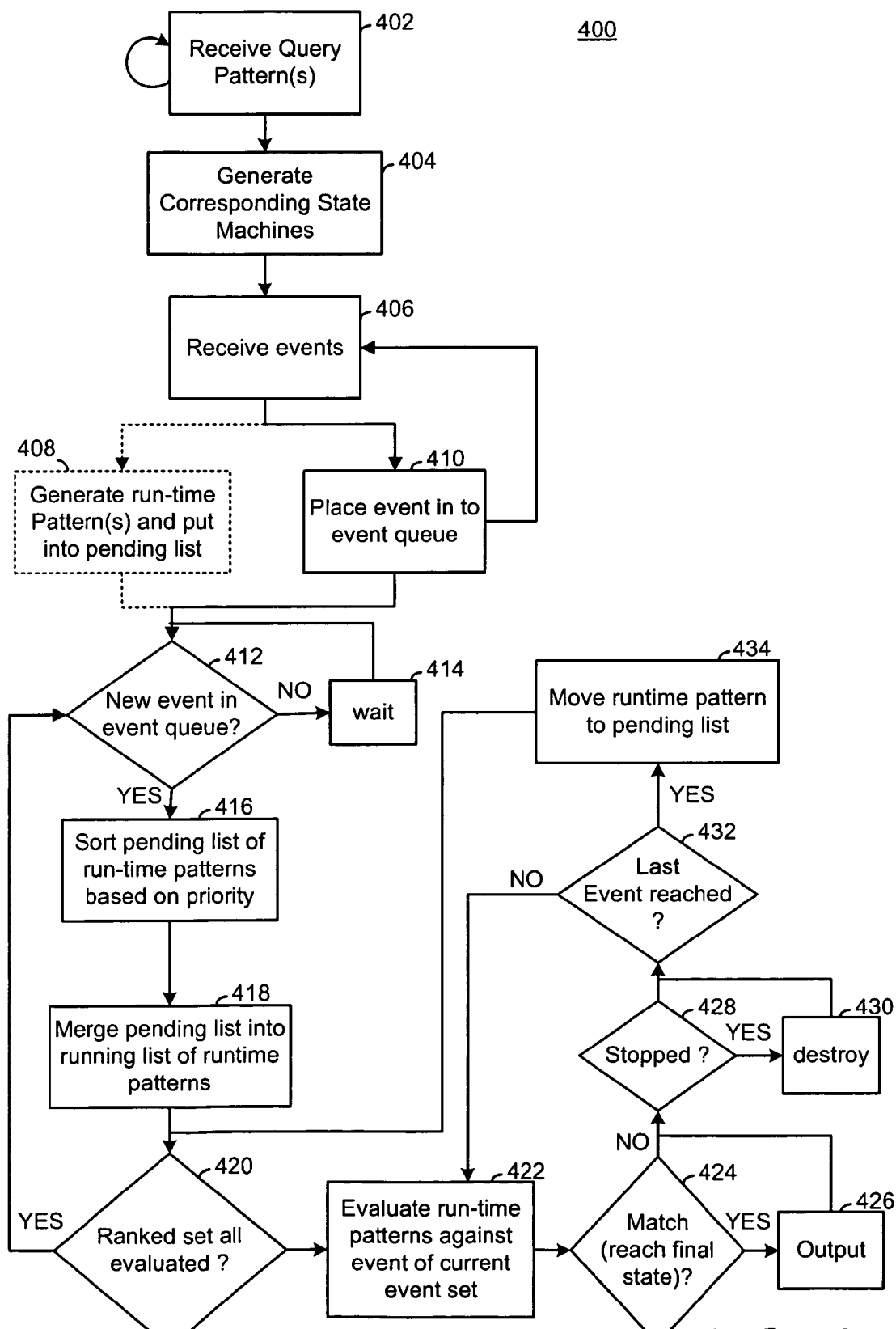
FIG. 4 is a second flowchart illustrating more detailed examples of operations of the system of FIG. 1.

FIG. 4 is a flowchart 400 illustrating more detailed example operations of the system 100 of FIG. 1. Operations of the flowchart 400 of FIG. 4 are discussed below in detail with respect to the specific examples of FIGS. 2A-2E in the context of the system 100 of FIG. 1.

In the example of FIG. 4, query patterns may be received (402) at the system 100. For example, the query pattern handler 110 may receive the query patterns 104, 106. Although the simplified example of FIG. 1 and FIGS. 2A-2E only describe the two query patterns 104, 106, it may be appreciated that a large number of such query patterns may be included. Moreover, such query patterns may be updated or added to the system 100, and incorporated into operations thereof, at virtually any time during the execution of the system 100.

Corresponding state machines may then be generated (404) for the received query patterns. For example, the state machine generator 116 may generate a state machine template based on the query pattern 104, and a separate state machine template reflecting requirements and constraints of the query pattern 106.

Events may then be received (406) at the system 100, such as, for example, events of the event stream 102. If a received event triggers an instantiation of a current runtime pattern and corresponding state machine, then the corresponding runtime pattern and associated instantiated state machine may be generated in response thereto and stored within the pending list 130 (406). For example, as described above, the instantiated state machine FIG. 2A corresponding to the runtime pattern 104A may be instantiated and placed into the pending list 130 in response to an event $e_0$ or previous event of FIG. 2E. Similarly, the instantiated state machine corresponding to the runtime pattern 106A of FIG. 2C may similarly be instantiated in response to the same received event which triggers a creation of the runtime pattern 104A. At this time, however, an event which triggers corresponding instantiation of runtime patterns 104B, 106B of FIGS. 2B and 2D may not yet have been received.

Nonetheless, during these and subsequent operations of the system 100, additional events may be received at the event scheduler 120 (406), so that the event queue 122 may be in the process of being updated, in parallel with the subsequently described operations associated with matching of a current event set within the event queue 122 against a corresponding ranked set of the pending list 130.

The event scheduler 120 may check to determine whether a new event has been received for inclusion within the event queue 122 (412). Although in the described example, this is the case, it may occur at previous or later iterations of the operations of the flowchart 400 that no new event has been received relative to a previous event set, so that the event scheduler 120 may simply continue to wait (414) for arrival of a new, subsequent event.

In the present example, with the instantiation of the runtime patterns 104A, 106A, the runtime pattern 104A of FIG. 2A may be considered to be in a current state 202A, while the runtime pattern 106A of FIG. 2C may be considered to be in a current state 216A. For the sake of example, it may be assumed that the system 100 is configured in the example of FIG. 4 such that the ranked set to be determined from the pending list 130 may be configured to include the two runtime patterns of the pending list 130 which are determined to have the corresponding two highest priority metrics of all the runtime patterns in the pending list 130. Then, in the present point in this example, only the two runtime patterns 104A, 106A exists, so that these runtime patterns may be considered to constitute the ranked set. In the example, such a determination thus represents sorting of the pending list 130 with respect to the priority metric to obtain the ranked set (416). Of course, as described in detail below, future iterations of the operations 400 of FIG. 4 will typically include actual calculations of the priority metric for each runtime pattern of the pending list 130, and subsequent sorting of the pending list 130 based thereon to obtain the (in this example) two runtime patterns of the ranked set.

In the present circumstance of the example, however, the ranked set of the pending list 130 may simply be merged into the running list 132 for subsequent provision to the pattern match evaluator 114 (418). At this point, not all of the runtime patterns of the ranked set have been evaluated (420), so that operations may proceed of evaluating a first selected runtime pattern of the ranked set against the current event set of the event queue 122 (422).

In the simplified present example, for example, the runtime pattern 104A may be matched against the current event set consisting of the single event $e_0$, so that no match or completion of the runtime pattern 104A, or advancement of a current state of the runtime pattern 104A, may be observed to exist (424). Of course, in other future examples, such a match may be realized, in which case the matched pattern may be output (426).

Otherwise, the runtime pattern 104A in question may be evaluated to determine necessity of stopping execution thereof (428), such as if the runtime pattern 104A were to reach a maximum window length specified within the query pattern 104. Again, if such an occurrence were to happen, then the stopped runtime pattern may be deleted or destroyed from the system 100 (430).

If a last event of the current event set has not been reached (432) then a subsequent event of the current event set may be matched again against the runtime pattern currently under consideration (422). In the presence of the provided example, since only the single event is included within the single current event set, then, in this example, the final event may be considered to be reached (432), so that the currently-considered runtime pattern may be moved to the pending list 130 (434).

If the final runtime pattern of the ranked set has not been reached (420), which is the case in the current example since the runtime pattern 106A has not yet been evaluated, then the above described operations 422-434 may be repeated for the next runtime pattern (106A) of the ranked set relative to the event of the current event set. Afterwards, in this example, the final runtime pattern of the ranked set will have been reached (420), so that operations may continue with a subsequent determination as to whether new events have been received (412).

In the example, it may occur that in the interim time during which operations 416-434 were executed as described above, additional events $e_1$, $e_i$, and $e_2$ are received at the event scheduler 120 (406, 410). Consequently, corresponding runtime patterns 104B and 106B of FIGS. 2B and 2D may be instantiated by the runtime pattern generator 118, and included within the pending list 130 (408). Thus, at this point, the pending list 130 includes all four runtime patterns 104A, 104B, 106A, 106B corresponding to FIGS. 2A-2D. Also at this time, the runtime patterns 104A and 106A of FIGS. 2A and 2C may still exist within respective current states 202A and 216A, since the previously described evaluation of operations 416-434 did not advance the runtime patterns 104A, 106A from these states.

Thus, since new events have in fact been received in the event queue (412), then the updated pending list 130 may be operated upon by the priority manager 128 using the appropriate priority metric, so as to sort the pending list 130 based on a calculated priority metric reached runtime pattern thereof, so as to thereby determine an updated or current ranked set (416). For the sake of example, it may occur that the priority manager 128 determines that the two runtime patterns of the ranked set and the current iteration of the flowchart 400 includes the runtime patterns 104A and 104B of FIGS. 2A and 2B (since, as mentioned above, it is assumed for the sake of example that the ranked set is to include the two highest-ranked runtime patterns). In this case, these two runtime patterns may be moved from the pending list 130 to the running list 132 (418).

Since neither of the two runtime patterns 104A, 104B of the current ranked set have been evaluated (420), then the evaluation may proceed of the first runtime pattern of the ranked set against a first event of the current event set (422). In the example, the runtime pattern 104A may be matched against the event e1, as shown in FIG. 2A, which meets the predicate condition 210A and advances the state machine of the runtime pattern 104A to the state 204A. Since this advancement does not cause a completion or match of the runtime pattern 104A (424), and does not result in a stoppage of the runtime pattern 104A (428), then a determination will be made as to whether the last event of the current event set has been reached (432).

Since additional events are included in the current event set, evaluation may continue with the next event of the event set (422), and so on through the operations 424, 428 and 432 until the event e2 is reached and evaluated against the runtime pattern 104A (422). As shown by FIG. 2A, the event e2 matches the predicate condition 212A and advances the state of the runtime pattern 104A from the state 204A to the state 206A. This advancement does not create a match (424), or a stoppage of the runtime pattern 104A (428), but, in the example, represents the last event of the current event set (432). Consequently, the runtime pattern 104A may be returned to the pending list 130 (434).

Since the ranked set of runtime patterns has not been completely evaluated (420), evaluation may proceed with respect to the second runtime pattern of the ranked set 104B relative to the event e1 (422). Operations continue as shown in FIG. 4, and as described throughout the runtime pattern 104A, with the net effect of advancing the state of the runtime pattern 104B from the state 202B to the state 204B, based on evaluation of the event $e_2$ and its installment of predicate condition 210B. Ultimately, the runtime pattern 104B may be returned to the pending list 130 as well, at which point, all runtime patterns of the ranked set will have been evaluated (420).

During the above described evaluations of the most recent event set, additional events may have been received by the event scheduler 120. For example, further intermediate events $e_i$ and event $e_3$ may have been received, as shown with respect to the timeline of FIG. 2E. Based on receipt of these new events within the event queue 122 (412), the above described operations 416-434 may be repeated.

For example, the current pending list of runtime patterns may be re-sorted or re-ranked, and based on the resulting calculated priority metric, it may be determined that the two runtime patterns having the highest priority metric and therefore forming the ranked set may be the runtime pattern 104A and the runtime pattern 106A. For example, both runtime patterns 104A, 106A may be observed to be in a next-to-final state of 214A, 218A, respectively, so that, in conjunction with other potential factors affecting the priority metric, may be determined to have the highest expectation and/or lowest cost for advancement to their respective final states.

In the example, then, the resulting ranked set may be merged into the running list 132 and then presented to the pattern match evaluator 114 by the run-based scheduler 124 in conjunction with events of the current event set presented to the pattern match evaluator 114 by the event scheduler 120. In applying operations 420-434 as described above, it may be observed that evaluation of the runtime pattern 104A against the current event set may result in evaluation of the event e3 in satisfaction of the predicate condition 214A (422), which thus creates a match of the runtime pattern 104A as it reaches its final state 208A (424) so that the completed runtime pattern 104A may be output (426) as a matched pattern 108. Similar comments apply in the evaluation of the runtime pattern 106A against the current event set $e_i$ followed by e3, so that the runtime pattern 106A also may be output from the system 100 of one of the matched patterns 108.

In a final iteration of the operations of the flowchart 400 of FIG. 4, the remaining runtime patterns 104B and 106B may constitute the ranked set and evaluated in the manner described above against an updated and newly-current event set, which may include remaining events through the event $e_4$. In this case, application of the operations 416-434 in the manner described above may be observed to result in a match or completion of the runtime patterns 104B and 106B for output thereof as part of the matched patterns 108. In this way, the various runtime patterns of the system 100 may be evaluated against constantly updated event sets in a manner which is associated with a minimal average response time of event sets and sets of match patterns.

Figure 5:
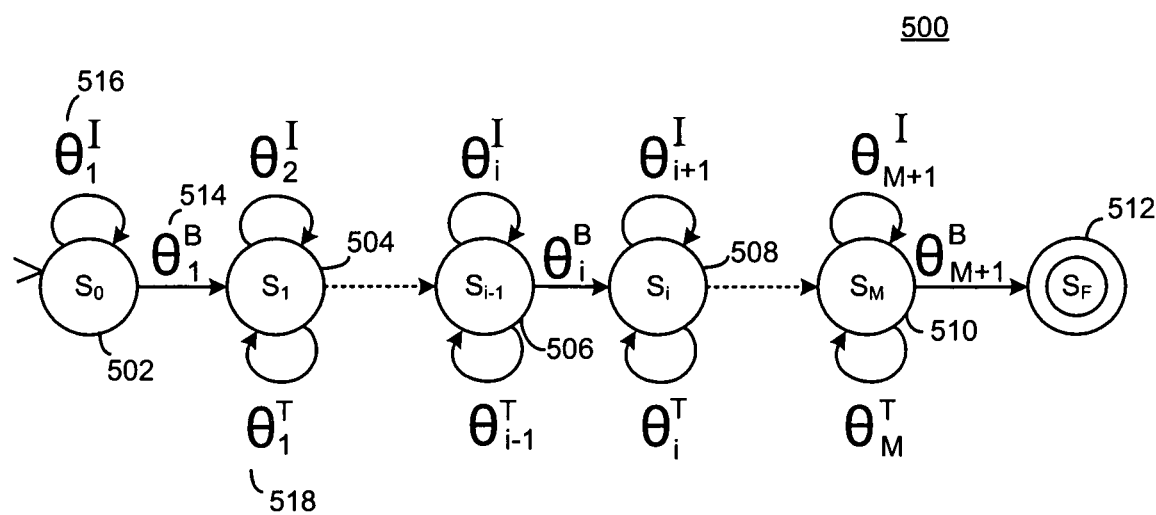
FIG. 5 is an example of a generic query pattern used in the system of FIG. 1, expressed as a state machine.

FIGS. 5 and 6 provide additional and more detailed examples and associated discussions of various elements of the system 100 and variations thereof. Specifically, FIG. 5 provides an example state machine implemented as a nondeterministic finite state machine or nondeterministic finite automaton (NFA). Such a NFA represents a finite state machine, where, for each pair of state(s) and associated predicate condition(s), there may be one or more next states. The NFA also may be expressed as a deterministic finite automaton (DFA), where the subsequent state is determined uniquely. Other state machine formulations also may be used, although in the following examples only the NFA is discussed in detail.

FIGS. 5 and 6 also are discussed with respect to a type of query pattern referred to, or including, a Kleene closure pattern. As is well known in the art, such a Kleene closure pattern generally refers to a pattern that contains a sequence of events of finite length which all satisfy a certain condition. A Kleene closure or Kleene star pattern refers to the set of all strings that can be generated by concatenating zero or more strings in a set S, and may be written as S*. A related pattern is known as the Kleene plus pattern, and is defined for the set S, such that $S^+$ is the smallest set containing S such that $S^+$ is closed under the concatenation. Kleene patterns are known to have a high complexity and difficulty when used as one of the query patterns 104, 106.

In the following discussion of FIGS. 5 and 6, the following notations and terminologies are used. An event stream S (such as the event stream 102 of FIG. 1) is a linearly ordered sequence of events S={e1; e2; ::::; en}. Each event object records a real-world event including the event type, a set of attributes, and a timestamp indicating the clock when it was created. A query pattern q over an event stream is q=(ES; Pr; W). While ES is an event sequence pattern, Pr is a set of predicates on the attributes of events in ES and the strategies of selecting events. W is the window size indicating the time period which the events are valid in ES. Thus, in this notation, pattern matching (i.e., to obtain pattern matches 108) is a procedure to find events over S to satisfy the query q.

Runtime patterns (r), as described above, include instances of query patterns currently being, or available for, evaluation. Runtime patters that are completed and returned as the query results are called matched patterns or pattern matchings (PM). The event which initials the start state of a new runtime pattern is called starting event, while the last event to complete a runtime pattern is the ending event. Then, the response time of the pattern matching PM is $RT=t^F-t^e$, where $t^F$ is the pattern matching PM's generation time, and r is the arrival time of the ending event ei.

Then, the average response time may be defined when the arrival of the $i^{th}$ event $e_i$ can generate $m_i$ pattern matchings. Then, the average response time for a query set $Q=\{q1, q2, \ldots\}$ may be defined as shown in Equation 1:

$$ART(n) = \frac{\sum_{i=1}^{n} \sum_{j=1}^{m_i} RT_{ij}}{\sum_{i=1}^{n} m_i} \quad \text{Equation (1)}$$

In Equation (1), $RT_{ij}$ is the time duration between the ending event $e_i$'s arrival and the completion time of the jth runtime pattern with the ending event $e_i$.

Thus, with regard to FIG. 5, the illustrated NFA automaton 500 may be considered as a quintuple $A(S, S0, SF, \Sigma, \theta)$ where S is a set of states 502-512. S0 is a start state and SF is a final state. θ is a set of directed edges representing possible transitions between states and θ is a set of formulas attached to the edges. Then, given a pattern matching query with its event sequence pattern as SEQ(e1, e2, . . . , Em), an NFA with m+2 states (denoted as S0, . . . , Sm, SF) may be created by the state machine generator 116, where S0 is the start state and SF is the final state.

Each state Si ($0 \le i \le m$) has a forward edge to the next state called begin edge with a formula attached to it (denoted as $\theta_{i+1}^B$ 514), and a self-loop edge called ignore edge with a formula $\theta_{i+1}^I$ 516 attached. The last forward edge attached to Sm is an edge called the proceed edge. There's also another self-loop edge attached to each state (except the start state) called the take edge, so that $\theta_{i+1}^T$ 518 is the formula attached to the take edge of Si (as shown in FIG. 5).

Thus, during the matching/evaluation process executed by the pattern match evaluator 114, a runtime pattern r starts from the start state and moves along the edge whose formula is satisfied by r with the current event, as described above. When a runtime pattern r moves along a begin edge or take edge, the current event e is consumed and accepted by r as part of the matching sequence. In contrast, e is consumed but not accepted by r when r moves along an ignore edge. In particular, the proceed edge may not consume any events, so that a runtime pattern r may move along the proceed edge immediately as long as it fulfills the formula attached to the proceed edge. If a few edges are fulfilled at the same time, r is split. The parent runtime pattern r moves along the begin edge (or the take edge if no begin/proceed edge is fulfilled) while its children move along the other edges. The window bound of r (e.g., determined by a WITHIN clause, as described below) is also checked every time r consumes a new event. If r's processing time exceeds its window bound or r can't move along any edges with the current event, it is rejected. When r reaches the final state, the current content (i.e. accepted events) of r is output as a pattern matching.

In the construction of $\theta^B$, a WHERE clause of the query pattern may first be converted into conjunctive normal form, and $\theta_i^B$ are the conjuncts are the conjuncts that involve only Ei (or the first instance of Ei if Ei is a Kleene plus pattern) and its preceding events appearing in the event sequence pattern. When Ei−1 is a Kleene plus pattern and the last instance of Ei−1 is the last event involved in the conjuncts, then the conjuncts should also be included in $\theta_i^B$. If there are no such conjuncts, $\theta_i^B$ is true (i.e., matches any event). In particular, $\theta_{m+1}^B$ is true unless Em is a Kleene plus pattern and the last instance of Em appears in a WHERE clause, thereof.

In the construction of $\theta^T$, if Ei is a Kleene plus pattern, $\theta_i^T$ are the conjuncts that involve the current instance of Ei and its preceding events appearing in the event sequence pattern. If Ei is a singleton event, $\theta_i^T$ is false (i.e., matches no event).

In the construction of $\theta^I$, at least three event selection strategies are used, including strict contiguity, skip till next match, and skip till any match. $\theta^I$ may take different values under the three strategies. $\theta_{i+1}^I$ is false for strict contiguity, is $\neg \theta_{i+1}^B \wedge \neg \theta_i^T$ for skip till next match, and is true for skip till any match. Also, $\theta_1^I = \neg \theta_1^B$.

In the above examples of FIGS. 1-4, the priority metric is defined generally, and may be understood to be formulated as-needed or as-desired by one of skill in the art. By way of specific example, however, the priority metric may be calculated using an expectation E(r) of a runtime pattern and C(r) of the runtime pattern. That is, the definition of average response time in Equation 1, above, reflects the duration between the arrival of ending events and the generation of pattern matchings. Therefore, to minimize the duration, as referenced above, it is preferable to give priority to the runtime patterns that will generate pattern matchings with higher probability and less cost. For $P(r)=\{P1; P2; ::; Pn\}$ defined as the set of independent paths from the current state Sr of runtime pattern r to the final state and path Hr be the historical path that r has gone through. Also let L(Pi) be the length of Pi and $\mathcal{P}$(Pi|r) be the conditional probability of r successfully passing through path Pi given r's content (the accepted events of r). Then, the probability that r arrives at the final state should be the sum of $\mathcal{P}$ (Pi|r) for all Pi in P(r). $\mathcal{P}$ (Pi|r) is further determined by the probability of r fulfilling individual conditions on Pi, which can be seen as the conditional probability under the condition that each preceding conditions on Pi are fulfilled by r.

Using the above notation(s), an expectation of a runtime pattern may be defined relative to the event distribution of stream S and a pattern query q, such that the expectation of a runtime pattern r is the probability that r generates a pattern matching on S, as shown in Equation (2), $$E(r) = \sum \mathcal{P}(P_i \mid r) = \sum_{i=1}^{|P(r)|} \prod_{j=1}^{L(P_i)} \mathcal{P}(\psi_j^{P_i} \mid r, \Psi_{j-1}^{P_i}) \quad \text{Equation (2)}$$

where $\Psi_j^{P_i}$ is the condition on the jth edge of Pi. $\Psi_{j-1}^{P_i} = \{\Psi_j^{P_i}, \ldots, \Psi_{j-1}^{P_i}\}$ is the sequence of conditions on the first j−1 edges of Pi.

Similarly, a definition for a cost of a matching may be determined, e.g., where the length of Pi is considered as the cost measure. In this case, an expected cost of a runtime pattern may be expressed as in Equation (3):

$$C(r) = \sum L(P_i)\mathcal{P}(P_i \mid r) \quad \text{Equation (3)}$$
$$= \sum_{i=1}^{|P(r)|} L(P_i) \prod_{j=1}^{L(P_i)} \mathcal{P}(\psi_j^{P_i} \mid r, \Psi_{j-1}^{P_i})$$

Using Equations (2) and (3), given r at runtime, ideally E(r) and C(r) can be estimated by enumerating each Pi and then calculating its probability based on the event distribution and r's content.

An alternative technique involves estimating the parameters offline, without knowing a runtime content of r. Since r's content is constrained by Hr, therefore for any r that has the same historical path Hr, P ($\Psi_j^{P_i}$ | r, $\Psi_{j-1}^{P_i}$) can be statically estimated as shown in Equation (4):

$$\mathcal{P}(\Psi_j^{P_i} \mid r, \Psi_{j-1}^{P_i}) \cong \mathcal{P}(\Psi_j^{P_i} \mid \Psi^r, \Psi_{j-1}^{P_i}) \quad \text{Equation (4)}$$

Where $\Psi^r = \{\Psi_1, \ldots, \Psi_{L(H_r)}\}$ is the sequence of conditions on $H_r$.

Two estimation methods for E(r) and C(r) are provided below. The first is based on a given event distribution of stream S, and the second is based on runtime statistics.

In the first case, estimation by event distribution, $S_0, \ldots, S_m$, $S_F$ represent the NFA states of pattern query q, and Sr is the current state of the runtime pattern r. $\theta_{i+1}^B$, $\theta_i^T$, $\theta_{i+1}^I$ are the formulas attached to the edges of $S_i$, as described above with respect to FIG. 5.

Then, considering all the possible paths for a runtime pattern r moving from Sr to SF, $\omega_i$ is a number of times that r passes through $\theta_i^T$, while $k_j^i (0 \geq j > \omega_i)$ is a number of times that r passes through $\theta_{i+1}^T$ exactly before the j+1$^{th}$ time r passes through $\theta_i^T$. $k_{\omega_i}^i$ is the number of times that r passes through $\theta_{i+1}^I$ exactly before r moves along $\theta_{i+1}^B$. Hence, a possible path from Sr to SF is fully determined by a set of given $\omega_i$ and $k_j^i$. if $\Omega = \{\omega_i, \ldots, \omega_m\}$ is the given set. By enumerating $k_j^i$, each possible path under the constraint may be obtained.

Then, to calculate the probability of a path P, the conditional probability of each condition θ on path P may be multiplied together. It may be observed that the conditional probability of each condition on path P is only impacted by the current content of r and its preconditions (i.e., a sequence of conditions attached to begin and take edges between Sr and θ in the path). Ignore edges may be ignored, since they do not change the content of r. Hence, the conditional probability of each condition may be fully determined (and not affected by $k_j^i$) if Ω is given.

An approximate method for accurately estimating the conditional probability of each condition may be constructed by considering the stream S as a dummy relational table T with the given event distribution (an event is seen as a row in the table). Then, the matching of an n-length event sequence on stream S is analogous to an n-way self-join of table T. The conditional probability of $\theta_i$ under a sequence of conditions $\theta_1, \theta_2, \ldots, \theta_{i-1}$ can be roughly estimated as shown in Equation (5):

$$\mathcal{P}(\theta_i \mid \theta_1, \ldots, \theta_{i-1}) \cong Sel_{\theta_i \wedge \ldots \wedge \theta_i}^n / Sel_{\theta_1 \wedge \ldots \wedge \theta_{i-1}}^{n-1} \quad \text{Equation (5)}$$

Where $Sel_\theta^n$ denotes the selectivity of n-way self-join of table T under condition θ.

The following discussion focuses only on the cases when the current state of runtime pattern r is not the start state. However, the described methods may be easily extended to handle the remaining cases.

Thus, if n is a length of ignore edges in path P and P ($P_\Omega^K$) is the probability of the path defined by a given Ω and a set $K = \{k_j^i\}$. Then L(P)=n+m−r+1+ΣΩ. A total probability of all the paths under Ω is shown in Equations (6) and (7):

$$E(r \mid \Omega) = \quad \text{Equation (6)}$$
$$\sum_{n=0}^{\infty} \sum_{\Sigma K=n} \mathcal{P}(P_\Omega^K) \sum_{n=0}^{\infty} \sum_{\Sigma_{i=r}^m} \sum_{\Sigma_{j=0}^{\omega_i} k_j^i = n} \prod_{i=r}^{m} \mathcal{P}(\theta_{i+1}^B \mid \Omega)$$
$$\prod_{j=0}^{\omega_i} \mathcal{P}^T(\theta_i^T \neg \theta_{i+1}^B \mid \Omega, j)$$
$$\mathcal{P}^I(\theta_{i+1}^I \neg \theta_i^T \neg \theta_{i+1}^B \mid \Omega, j)^{k_j^i}$$

$$C(r \mid \Omega) = \sum_{n=0}^{\infty} \sum_{\Sigma K=n} L(P_\Omega^K) \mathcal{P}(P_\Omega^K) = \quad \text{Equation (7)}$$
$$\sum_{n=0}^{\infty} \sum_{\Sigma_{i=r}^m} \sum_{\Sigma_{j=0}^{\omega_i} k_j^i = n} (n + m - r + 1 + \Sigma\Omega)$$
$$\prod_{i=r}^{m} \mathcal{P}(\theta_{i+1}^B \mid \Omega) \prod_{j=0}^{\omega_i} \mathcal{P}^T(\theta_i^T \neg \theta_{i+1}^B \mid \Omega, j)$$
$$\mathcal{P}^I(\theta_{i+1}^I \neg \theta_i^T \neg \theta_{i+1}^B \mid \Omega, j)^{k_j^i}$$

Given the current content of r, $P(\theta_{i+1}^B | \Omega)$ is the probability of $\theta_{i+1}^B$ under a precondition sequence $\{(\theta_r^T)^{\omega_r}, \theta_{r+1}^B, \ldots, \theta_i^B, (\theta_i^T)^{\omega_i}\}$, where $(\theta_i^T)^{\omega_i}$ denotes that $\theta_i^T$ appears $\omega_i$ times in the sequence. Similarly, $\mathcal{P}^I(\theta_{i+1}^I \neg \theta_i^T \neg \theta_{i+1}^B | \Omega, j)$ is the probability of $\theta_{i+1}^I \neg \theta_i^T \neg \theta_{i+1}^B$ under the precondition sequence of $\{(\theta_r^T)^{\omega_r}, \theta_{r+1}^B, \ldots, \theta_i^B, (\theta_i^T)^j\}$.

Then, $\mathcal{P}^T(\theta_i^T \neg \theta_{i+1}^B | \Omega, j)$ is the probability of $\theta_i^T \neg \theta_{i+1}^B$ under the precondition sequence $\{(\theta_r^T)^{\omega_r}, \theta_{r+1}^B, \ldots, \theta_i^B, (\theta_i^T)^j\}$ when j is not equal to $\omega_i$. In the case that j does equal $\omega_i$, $\mathcal{P}^T(\theta_i^T \neg \theta_{i+1}^B | \Omega, j)$ is defined as 1.

Then, Equations (6) and (7) may be simplified using Equations (8) and (9), below:

$$\sum_{n=0}^{\infty} \sum_{(x_1+\ldots x_m=n)} \prod_{i=1}^{m} (1 - \mathcal{P}_i)^{x_i} \mathcal{P}_i = \begin{cases} 1 : \mathcal{P}_i \in (0, 1] \\ 0 : \exists \mathcal{P}_i = 0 \end{cases} \quad \text{Equation (8)}$$

$$\sum_{n=0}^{\infty} (n+m) \sum_{(x_1+\ldots x_m=n)} \prod_{i=1}^{m} (1 - \mathcal{P}_i)^{x_i} \mathcal{P}_i = \quad \text{Equation (9)}$$
$$\begin{cases} \sum_{i=1}^{m} \frac{1}{\mathcal{P}_i} : \mathcal{P}_i \in (0, 1] \\ 0 : \exists \mathcal{P}_i = 0 \end{cases}$$

If $\mathcal{P}^I(\neg \theta_{i+1}^I \vee \theta_i^T \vee \theta_{i+1}^B | \Omega, j) = 1 - \mathcal{P}^I(\theta_{i+1}^I \neg \theta_i^T \neg \theta_{i+1}^B | \Omega, j)$, then Equations (6) and (7) may be expressed as Equations (10) and (11):

$$E(r \mid \Omega) = \begin{cases} 0 & : \exists \mathcal{P}^I(\neg \theta_{i+1}^I \vee \theta_i^T \vee \theta_{i+1}^B \mid \Omega, j) = 0 \\ \prod_{i=r}^{m} \mathcal{P}(\theta_{i+1}^B \mid \Omega) \prod_{j=0}^{\omega_i} \mathcal{P}^T(\theta_i^T \neg \theta_{i+1}^B \mid \Omega, j) \mathcal{P}^I(\neg \theta_{i+1}^I \vee \theta_i^T \vee \theta_{i+1}^B \mid \Omega, j)^{-1} \\ & : \forall \mathcal{P}^I(\neg \theta_{i+1}^I \vee \theta_i^T \vee \theta_{i+1}^B \mid \Omega, j) \neq 0 \end{cases} \quad \text{Equation (10)}$$

$$C(r \mid \Omega) = \begin{cases} 0 & : \exists \mathcal{P}^I(\neg \theta_{i+1}^I \vee \theta_i^T \vee \theta_{i+1}^B \mid \Omega, j) = 0 \\ E(r \mid \Omega)\left(\sum_{i=r}^{m}\sum_{j=0}^{\omega_i} \mathcal{P}^I(\neg \theta_{i+1}^I \vee \theta_i^T \vee \theta_{i+1}^B \mid \Omega, f)^{-1}\right) \\ & : \forall \mathcal{P}^I(\neg \theta_{i+1}^I \vee \theta_i^T \vee \theta_{i+1}^B \mid \Omega, j) \neq 0 \end{cases} \quad \text{Equation (11)}$$

Given a runtime pattern r, the maximum length of pattern matching of q may be expressed as Lmax(q), leading to a constraint that $\Sigma\Omega$ is less than or equal to $L_{max}(q)-L(\text{Content}_r)-(m-r)$, where $L(\text{Content}_r)$ is the number of accepted events of r. A second constraint may be expressed as $\omega_i=0$ if $\theta_i^T$ is necessarily false (since r cannot pass through the take edge). Hence, the expectation and expected cost of r can be estimated by enumerating every possible $\Omega$ under the constraints, denoted as: $\Sigma_{constraints} E(r|\Omega)$ and $\Sigma_{constraints} C(r|\Omega)$.

From the above discussion, it can be observed that, given a runtime pattern r, the calculation of E(r) and C(r) is exponential to the number of take edges in its NFA. Although the number of take edges in a query is usually quite small, the calculation may still be infeasible to be performed at runtime. Further, in most cases a runtime pattern's expectation and expected cost are closely related to its current state. Therefore, the average expectation and expected cost of all runtime patterns appearing on a state Sr may be taken as a good approximation for E(r) and C(r) in practice, which can be estimated using Equations (12) and (13):

$$\tilde{E}(r) = \frac{\Sigma_{constrains} E_{Sr}(r_{begin} \mid \Omega) E(r_\Omega)}{\Sigma_{constrains} E_{Sr}(r_{begin} \mid \Omega)}$$

$$\tilde{C}(r) = \frac{\Sigma_{constrains} E_{Sr}(r_{begin} \mid \Omega) C(r_\Omega)}{\Sigma_{constrains} E_{Sr}(r_{begin} \mid \Omega)}$$

Equation (12) and (13)

In Equations (12) and (13), $r_{begin}$ is a dummy runtime pattern on the start state and $\Omega=\{\omega_1, \ldots, \omega_{r-1}\}$ represents a constraint on paths from $S_0$ to Sr. ESr (rbegin I $\Omega$) denotes the expectation of rbegin moving from S0 to Sr under a given $\Omega$. $r_\Omega$ is a dummy runtime pattern on $S_r$ whose $\Psi^{r\Omega}=\{\theta_i^B, (\theta_1^T)^{\omega_1}, \theta_2^B, (\theta_2^T)^{\omega_2}, \ldots, \theta_r^B\}$. Therefore, $E(r_\Omega)$ and $C(r_\Omega)$ may be evaluated without knowing its exact content, using Equations (4), (10), and (11).

Thus, given the event distribution of stream S, Equations (12) and (13) may be evaluated offline for each state of query q and stored in a table. Then, at runtime, a runtime pattern's expectation and expected cost can be simply retrieved from the table based on its current state, without incurring significant runtime overhead.

As referenced above, a second technique for determining E and C, and thus the priority metric, may be to implement statistics-based estimation. For example, in cases when event distribution is not available or the pre-defined pattern queries have a large number of take edges, the above-described method(s) for estimating expectation and expected cost may not be applicable. An alternative approach may be used, which is based on a query q's runtime statistics.

In this approach, the following statistics are maintained for each NFA state: SucceededRuns, TotalRuns and TotalCost. For each runtime pattern that passes through a state, Total-Runs of the state is increased by 1. For each runtime pattern r that reaches the final state and generates a pattern matching, S1, ..., Sm represents the list of states that r has gone through since it was instantiated. For each Si, i $\in[1, m]$, SucceededRuns may be increased by 1 and TotalCost may be increased by the number of steps that r has moved from Si to SF.

Then the approximation of E(r) and C(r) can be estimated using Equations (14) and (15):

$$\tilde{E}(r) = \text{Succeededruns}_{Sr}/\text{TotalRuns}_{Sr}$$

$$\tilde{C}(r) = \text{TotalCost}_{Sr}/\text{TotalRuns}_{Sr} \quad \text{Equations (14) and (15)}$$

in which Sr is the current state of r and $\text{SucceededRuns}_{Sr}$, $\text{TotalRuns}_{Sr}$, $\text{TotalCost}_{Sr}$ are the three statistic values of Sr. If $\text{TotalRuns}_{Sr}$ is 0, Equations (14) and (15) may be considered 0, as well.

A window W can be applied in conjunction with Equations (14) and (15), so that only the statistics collected within the window (e.g. last one hour) are taken into consideration. The size of W should be determined based on the nature of event stream S and query q, which may affect the accuracy and agility of Equations (14) and (15).

As referenced above with respect to FIGS. 1-4, a runtime pattern in system 100 (which also is referred to as a run), may be considered to have three modes, e.g., running, pending, and stopped. When an event matches the first edge of a query q, a new run may be created and put into the running list to wait for execution. After a runtime pattern consumes the last event in the input buffer, it is moved to the pending list. When new events come, the runtime patterns in the pending list are moved back to the running list and ready for execution. A run may be stopped if it reaches the final state or falls out of the window bound, or if it cannot move along any edge with the current event.

A special run may be created for each query called the root run, which always stays on the start state and does not have a window bound. The root run consumes each input event and generates a child run moving along the begin edge if the current event fulfills the conditions on the edge. In this way, the creation process and the execution process may effectively be combined into one. The root run's expectation and expected cost may be calculated as normal runtime patterns.

Besides its content, a run also may contain an id of the last event that it has consumed and an id of its current automaton state. When it is executed, it may read the current event and try to move along the edges attached to its current automaton state by testing the formulas on these edges.

Algorithm 1 refers to an implementation of FIG. 1 referred to as hybrid scheduling. In this scheduling approach, in which event-based scheduling is combined with runtime based scheduling, a longest execution time of the runtime based scheduling may be a dynamic value which is the time needed for processing the events available in the current input buffer, as shown in Algorithm 1.

---

Algorithm 1

---

1:   for each query q in the query set do
2:       create a root run and put it into the pending list;
3:   end for
4:   while ! the end of event stream do
5:       check if the input event buffer has been updated with new events since last check;
6:       if the input event buffer has been updated then
7:           merge the pending list into the running list;
8:       end if
9:       if if the running list is not empty then
10:          for each run r in the running list do
11:             execute r until it reaches pending or stopped state:
12:             put the generated child runs into the children list;
13:             if r stops then
14:                 destroy r;
15:             else
16:                 move r from the running list to the pending list;
17:             end if
18:          end for
19:          merge the children list into the running list;
20:       end if
21:   end while

---

As may be observed, Algorithm 1 does not take into account the prioritization/ranking of runtime patterns. To do so, the system 100 may make use of the priority metric, e.g., as described herein. That is, as described above, given a stream S and a query set Q, the execution order of runtime patterns determines the average response time of Q. Due to the nature of event stream processing, the overhead of the scheduling should be small compared with runtime pattern execution.

Thus, a priority metric for a runtime pattern may be expressed, as shown, e.g., in Equation (16)):

$$\text{Priority}(r) = \frac{E(r)^2}{C(r)}$$

As may be understood from the above discussion, priority(r) may be implemented as a single measurement for the execution priority of r. When C(r) is 0, Priority(r) is defined as 0, as already described.

As may be appreciated from the above discussion, when a runtime pattern moves to its next state, it should update its content as well as its priority. Then the scheduler should select the run with the highest priority value to execute at each round in Algorithm 2., below. The runtime overhead of the above procedure involves frequent sorting, however, by ranking the runtime patterns according to the priority metric Priority(r). In order to balance the overhead and gain, the system 100 fetches top K runs in the sorted list to process as the ranked set. The whole process is illustrated in detail in Algorithm 2.

---

Algorithm 2

---

1:   for each query q in the query set do
2:       create a root run and put it into the pending list;
3:   end for
4:   while ! the end of event stream do
5:       check if the input event buffer has been updated with new events since last check;
6:       if the input event buffer has been updated then
7:           sort the pending list by the priority of runtime pattern in descending order;
8:           merge the pending list into the running list with order preservation;
9:       end if
10:       if if the running list is not empty then
11:          select the first K runs in the running list;
12:          for each run r in the K runs do
13:             execute r until it reaches pending or stopped state;
14:             put the generated child runs into the children list;
15:             if r stops then
16:                 destroy r;
17:             else
18:                 move r from the running list to the pending list;
19:             end if
20:          end for
21:          sort the children list by the priority of runtime pattern in descending order;
22:          merge the children list into the running list with order preservation;
23:       end if
24:   end while

---

As described herein, the system 100 may select K runtime patterns with the top K priority values at each decision making point. The priority formula favors the runtime patterns which have high probability and small cost. However, the implication or result of this approach is that the runtime patterns of low priority, would wait for a long time and this may result in starvation. Such a starvation may occur when the streaming events have skewed favor of queries. The starvation does not have impact on achieving fast average response time but it may result in many unsatisfied customers. To prevent starvation of runtime patterns, the priority equation may be adapted by adding a function of time to increase the ranking of runtime patterns queued for a period.

The following three example queries illustrate example real-world settings for the use of the system 100, as well as example syntax for formulating the query patterns 104, 106.

---

(a) Query 1:

---

PATTERN   SEQ(Shelf a, ~(Register b), Exit c)
WHERE     skip_till_next_match(a, b, c) {
              a.tag_id = b.tag_id
  and       a.tag_id = c.tag_id
              /* equivalently, [tag_id] */  }
WITHIN    12 hours

---

In query 1, corresponding, e.g., to the query pattern 104, it may be observed to represent a customer stealing, e.g., shoplifting, e.g., and therefore reports items that were picked at a shelf and then taken out of the store without being checked out. The pattern clause of Query 1 specifies a sequence pattern with three components: the occurrence of a shelf reading, followed by the non-occurrence of a register reading, followed by the occurrence of an exit reading.

| (b) Query 2: |
| --- |
| PATTERN SEQ(Alert a, Shipment+ b[ ]) |
| WHERE    skip_till_any_match(a, b[ ]) { |
|                   a.type = 'contaminated' |
|    and      b[1].from = a.site |
|    and      b[i].from = b[i−1].to } |
| WITHIN  3 hours |

In query 2, contamination detects contamination in a food supply chain. It captures an alert for a contaminated site and reports a unique series of infected shipments in each pattern match. An array variable b[ ] is declared for the Kleene plus component, with b[1] referring to the shipment from the origin of contamination, and b[i] referring to each subsequent shipment infected via collocation with the previous one. The predicates may specify these constraints on the shipments. In particular, the predicate that compares b[i] with b[i−1] (i>1) species the collocation condition between each shipment and its preceding one.

Here the sequence pattern uses a Kleene plus operator to compute each series of shipments (where '+' means one or more).

| (c) Query 3: |
| --- |
| PATTERN SEQ(Stock+ a[ ], Stock b) |
| WHERE   skip_till_next_match(a[ ], b) { |
|                 [symbol] |
|    and     a[1].volume > 1000 |
|    and     a[i].price > avg(a[..i−1].price) |
|    and     b.volume < 80%*a[a.LEN].volume } |
| WITHIN  1 hour |

Thus, query 3 captures a complex stock market trend. In the past hour, the volume of a stock started high, but after a period when the price increased or remained relatively stable, the volume plummeted. This pattern has two components: a Kleene plus on stock events, whose results are in a[ ]; and a separate single stock event, stored in b.

The predicate on a[1] addresses the initial volume. The predicate on a[i] (i >1) requires the price of the current event to exceed the average of the previously selected events (those previously selected events are denoted by a[ . . . i−1]). This way, the predicate captures a trend of gradual (not necessarily monotonic) price increase. The last predicate compares b to a[a.len], where a.len refers to the last selected event in a[ ], to capture the final drop in volume. FIG. 6 illustrates another example of a state machine corresponding to the example of Query 3, including the various formulas that go with that state machine Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a computer-readable medium, the system comprising:
a query pattern handler configured to determine at least one query pattern to be matched against a stream of events, and configured to determine a plurality of run-time patterns representing active instances of the at least one query pattern which are currently available for matching, and which are expressed as finite state machines including a plurality of states;

an event scheduler configured to receive an event of the stream of events, the event associated with a current event set of the stream of events;

a run-time pattern scheduler configured to determine, at runtime, a ranked set of the run-time patterns based on a priority metric which includes, for each run-time pattern, an expectation of completion that is determined based on a length of each independent path through each state machine and a probability of completion of each path; and a pattern match evaluator configured to evaluate each runtime pattern of the ranked set, in turn, against the current event set.

2. The system of claim 1, wherein the query pattern handler comprises a state machine generator configured to generate the finite state machines, wherein each finite state machine includes the plurality of states connected by edges having predicate conditions to be evaluated against events of the stream of events.

3. The system of claim 1, wherein the query pattern handler comprises a runtime pattern generator configured to generate each runtime pattern of the plurality of runtime patterns, in response to a corresponding triggering event of the stream of events.

4. The system of claim 1, wherein the event scheduler comprises an event queue configured to store the current event set.

5. The system of claim 1 wherein the runtime pattern scheduler comprises a pattern list manager configured to maintain a pending list of the runtime patterns which are available for matching, and a running list which includes a subset of the pending list, including the ranked set, for provision to the pattern match evaluator therefrom.

6. The system of claim 1, wherein the runtime pattern scheduler comprises a priority manager configured to calculate the priority metric based on characteristics of the stream of events.

7. The system of claim 1, wherein the runtime pattern scheduler comprises a priority manager configured to calculate the priority metric based on a current state of each runtime pattern.

8. The system of claim 1, wherein the plurality of states are connected by edges having predicate conditions to be evaluated against events of the stream of events, and wherein the runtime pattern scheduler comprises a priority manager configured to calculate the priority metric for each runtime pattern including a conditional probability of the completion of each path considering individual predicate conditions of each path.

9. The system of claim 1, wherein the plurality of states are connected by edges having predicate conditions to be evaluated against events of the stream of events, and wherein the runtime pattern scheduler comprises a priority manager configured to calculate the priority metric for each runtime pattern including a cost of completion that is determined based on the length of each independent path through each state machine.

10. The system of claim 1, wherein the runtime pattern scheduler comprises a priority manager configured to calculate the priority metric based on the expectation of completion of the runtime pattern relative to a cost of completion of the runtime pattern.

11. The system of claim 10, wherein the priority manager is configured to use a dummy runtime pattern during a design time to estimate and store the expectation and cost for each state of a runtime pattern, and configured to compare a current event distribution and current state of the runtime pattern during runtime to retrieve a corresponding expectation and cost.

12. The system of claim 1, wherein the plurality of states are connected by edges having predicate conditions, and wherein the pattern match evaluator is configured to evaluate each runtime pattern by comparing events of the current event set against each runtime pattern of the ranked set to determine whether each event of the current event set satisfies a current predicate condition thereof 13. The system of claim 1
wherein the pattern match evaluator is configured to output matched and completed runtime patterns of the ranked set as matched patterns, and further configured to return any remaining runtime patterns of the ranked set to the run-time pattern scheduler.

14. The system of claim 13, wherein the run-time pattern scheduler is configured to receive the remaining runtime patterns for combination with any newly-available runtime patterns, and configured to re-determine the priority metric for each runtime pattern of the combination to determine an updated ranked set to be evaluated against an updated event set.

15. A computer-implemented method for executing instructions stored on a computer readable storage medium, the method comprising:
determining at least one query pattern to be matched against a stream of events;
receiving an event of the stream of events, the event associated with a current event set of the stream of events;
determining a plurality of run-time patterns representing active instances of the at least one query pattern which are currently available for matching, and which are expressed as finite state machines including a plurality of states;
determining, at runtime, a ranked set of the run-time patterns based on a priority metric which includes, for each run-time pattern, an expectation of completion that is determined based on a length of each independent path through each state machine and a probability of completion of each path; and
evaluating each run-time pattern of the ranked set, in turn, against the current event set.

16. The method of claim 15, wherein determining the plurality of run-time patterns comprises generating the finite state machines to represent each runtime pattern, each finite state machine including the plurality of states connected by edges having predicate conditions to be evaluated against events of the stream of events.

17. The method of claim 15 wherein the evaluating comprises:
outputting matched and completed runtime patterns of the ranked set as matched patterns; and
returning any remaining runtime patterns of the ranked set for combination with any newly-available runtime patterns.

18. The computer program product of claim 17, wherein the instructions, when executed, are further configured to:
output matched and completed runtime patterns of the ranked set as matched patterns;
return any remaining runtime patterns of the ranked set for combination with any newly-available runtime patterns; and re-determine the priority metric for each runtime pattern of the combination to determine an updated ranked set to be evaluated against an updated event set.

19. The method of claim 15, comprising:

re-determining the priority metric for each runtime pattern of the combination to determine an updated ranked set to be evaluated against an updated event set.

20. A computer program product, the computer program product being tangibly embodied on a computer-readable storage medium and comprising instructions that, when executed, are configured to:

determine at least one query pattern to be matched against a stream of events;

receive an event of the stream of events, the event associated with a current event set of the stream of events;

determine a plurality of run-time patterns representing active instances of the at least one query pattern which are currently available for matching, and which are expressed as finite state machines including a plurality of states;

determine, at runtime, a ranked set of the run-time patterns based on a priority metric which includes, for each run-time pattern, an expectation of completion that is determined based on a length of each independent path through each state machine and a probability of completion of each path; and evaluate each run-time pattern of the ranked set, in turn, against the current event set.

* * * * *